United States Patent
Mountain

(10) Patent No.: US 9,350,936 B2
(45) Date of Patent: May 24, 2016

(54) CONTROLLING PLAYBACK OF RECORDINGS

(75) Inventor: Dale Llewelyn Mountain, Keighley (GB)

(73) Assignee: EchoStar UK Holdings Limited, Steeton (GB)

( * ) Notice: Subject to any disclaimer, the term of this patent is extended or adjusted under 35 U.S.C. 154(b) by 224 days.

(21) Appl. No.: 13/396,470

(22) Filed: Feb. 14, 2012

(65) Prior Publication Data

US 2012/0210368 A1 Aug. 16, 2012

(30) Foreign Application Priority Data

Feb. 15, 2011 (EP) .................................... 11154588

(51) Int. Cl.
| | | |
|---|---|---|
| G06F 3/00 | (2006.01) | |
| G06F 13/00 | (2006.01) | |
| H04N 5/445 | (2011.01) | |
| H04N 5/91 | (2006.01) | |
| H04N 21/433 | (2011.01) | |
| H04N 21/472 | (2011.01) | |
| H04N 21/482 | (2011.01) | |
| H04N 5/782 | (2006.01) | |

(52) U.S. Cl.
CPC ............. *H04N 5/91* (2013.01); *H04N 5/44543* (2013.01); *H04N 5/782* (2013.01); *H04N 21/4334* (2013.01); *H04N 21/47214* (2013.01); *H04N 21/482* (2013.01)

(58) Field of Classification Search
None
See application file for complete search history.

(56) References Cited

U.S. PATENT DOCUMENTS

| | | | | |
|---|---|---|---|---|
| 6,226,447 | B1 * | 5/2001 | Sasaki | .................... H04H 20/74 386/230 |
| 7,778,520 | B1 * | 8/2010 | Virden et al. | .................. 386/278 |
| 8,074,249 | B2 * | 12/2011 | Shikata | ............. H04N 7/17318 725/109 |
| 8,380,050 | B2 | 2/2013 | Kummer | |

(Continued)

FOREIGN PATENT DOCUMENTS

| | | |
|---|---|---|
| DE | 10 2005 021 243 A1 | 11/2006 |
| EP | 1 571 840 A1 | 9/2005 |

(Continued)

OTHER PUBLICATIONS

Extended European Search Report mailed Apr. 27, 2011, issued in corresponding European Patent Application No. 11154588.5, filed Feb. 15, 2011.

(Continued)

*Primary Examiner* — Jonathan V Lewis
(74) *Attorney, Agent, or Firm* — Seed IP Law Group PLLC

(57) ABSTRACT

A method of operating a user device for receiving and recording media content. The method includes receiving a media content stream, and initial timing data, such as EPG data, indicative of the time at which a selected program contained within the media content stream is scheduled to begin. At least a portion of the media content stream containing the selected program is recorded to a memory using the initial timing data to determine the recording start and finish time. Second updated timing data, indicative of the time at which the program began, is also received. A portion of the recorded media content stream is then deleted between the beginning of the recording and the beginning of the program as identified by the second timing data. A corresponding apparatus and appropriate computer program are also provided.

19 Claims, 3 Drawing Sheets

(56) References Cited

U.S. PATENT DOCUMENTS

| | | | |
|---|---|---|---|
| 2002/0018637 A1* | 2/2002 | Saito | G11B 27/107 |
| | | | 286/241 |
| 2002/0092022 A1* | 7/2002 | Dudkicwicz et al. | 725/58 |
| 2002/0174433 A1* | 11/2002 | Baumgartner et al. | 725/58 |
| 2003/0066069 A1* | 4/2003 | Mankovich | 725/9 |
| 2003/0093790 A1* | 5/2003 | Logan et al. | 725/38 |
| 2003/0198461 A1* | 10/2003 | Taylor et al. | 386/83 |
| 2004/0247284 A1* | 12/2004 | Yamasaki | G11B 27/031 |
| | | | 286/241 |
| 2006/0051059 A1* | 3/2006 | Krakirian et al. | 386/83 |
| 2006/0064721 A1* | 3/2006 | Del Val et al. | 725/41 |
| 2006/0222327 A1* | 10/2006 | Abe et al. | 386/83 |
| 2006/0253867 A1 | 11/2006 | Potrebic et al. | |
| 2008/0148313 A1* | 6/2008 | Ozawa | H04N 5/44543 |
| | | | 725/39 |
| 2008/0184316 A1* | 7/2008 | Mori et al. | 725/62 |
| 2009/0133092 A1 | 5/2009 | Casagrande | |
| 2009/0257732 A1* | 10/2009 | Callaway et al. | 386/83 |
| 2010/0086277 A1* | 4/2010 | Craner | 386/52 |
| 2010/0169942 A1* | 7/2010 | Dasher | 725/100 |
| 2011/0197251 A1* | 8/2011 | Kummer | 725/132 |

FOREIGN PATENT DOCUMENTS

| | | |
|---|---|---|
| EP | 1 622 371 A1 | 2/2006 |
| JP | 2006180264 A | 7/2006 |
| WO | 2008/032955 A1 | 3/2008 |

OTHER PUBLICATIONS

"Digital TV—Nielsen DVR Penetration and Measurement" retrieved from Multiplatform internet site located at http://wwwtvb.org/multiplatform/Digital_TV/Nielsen_DVR_Measurement.aspx on Feb. 18, 2010, 2 pages.

European Search Report, mailed May 27, 2011, for corresponding International Application No. 11153752.8-2202, 8 pages.

* cited by examiner

CONTROLLING PLAYBACK OF RECORDINGS

BACKGROUND

1. Technical Field

The present disclosure relates to a method, and corresponding system, for automatically adjusting the playback length of recordings, particularly recordings of media content such as video and/or audio.

2. Description of the related art

Many user devices, such as set-top-boxes, or similar devices, allow a user to receive and output media content whilst also incorporating a recording function. One example would be a set-top-box (STB) that incorporates a digital video recorder (DVR), sometimes also known as a personal video recorder (PVR). These devices include a re-writeable memory, such as a hard disk drive or other format such as flash memory, which allows data to be written to it and be overwritten with new data when that data is no longer required. Such a system allows users to record "live" programs and watch them at a later time.

Most DVRs offer a feature to start recordings early and end late. Typically, the DVR will initiate recording at around 5 minutes prior to the scheduled start of a program and finish around 5 minutes after to accommodate charges in the broadcast schedule.

BRIEF SUMMARY

As mentioned above, typically a DVR will initiate recording at around 5 minutes prior to the scheduled start of a program and finish around 5 minutes after to accommodate charges in the broadcast schedule. This leads to recordings very often including unwanted content/data at the start and end which the user does not want, and which takes up storage space on the DVR memory.

It would be advantageous to be able to provide a DVR, or other recording device, that reduces the user having to deal with excess recording data.

Embodiments of the disclosure may rely on receiving accurate timestamps after, or subsequently to, the broadcast of a program, for example on an out of band channel or internet connection, to a user recording device. The recording device may then automatically remove, or trim, any excess program data from the start and/or the end of the recordings.

Embodiments of the disclosure may provide a method of operating a user device for receiving and recording media content. An embodiment comprises receiving, at one or more inputs, a media content stream, and initial timing data, such as EPG data, indicative of the time at which a selected program contained within the media content stream is scheduled to begin. At least a portion of the media content stream containing the selected program is recorded to a memory using the initial timing data to determine the recording start and finish time. Second updated timing data, indicative of the time at which the program began, is also received. A portion of the recorded media content stream is then deleted between the beginning of the recording and the beginning of the program as identified by the second timing data. The second timing data may be made more accurate than the first or initial timing data, and therefore recorded content that does not contain the desired program may not be output. Deleting at least a portion of the recorded media content stream based on the second timing data saves on finite memory space. This also allows the viewer to begin watching their content faster.

The second timing data may be received before or after the content is sent. In an embodiment, the second timing data is received afterwards, or at least after the content has begun sending, and is determined based on the send time of the content. The second timing data may be received via the internet or by broadcast for example.

In an embodiment, the media content stream is received via broadcast from a broadcast system, and the method further comprises the step of receiving synchronization timing data for synchronizing the user device with the broadcast system and wherein the second timing data is relative to the synchronization timing data. The synchronization timing data may be PCR data.

In an embodiment, the method may also include the step of receiving, in the initial timing data, further data indicative of the time the selected program is scheduled to finish and also receiving, in the second timing data, updated, or more accurate, data identifying the finish time of the selected program. At least a portion of the recorded media content stream between the finish time of the program identified by the second timing data and the end of the recording is then deleted. This enables space to be saved by removing unwanted content from the end of the recording.

In an embodiment, deletion of content from the recorded media stream is achieved by identifying the portion to be deleted as being available memory space. For example, the "hole punching" method of deletion and file management can be used, whereby memory blocks containing unwanted media content are identified in an appropriate list as being free to store data.

In an embodiment, the initial timing data may be further indicative of the time at which an event related to the selected program contained within the media content stream is scheduled to occur, the event being the start time of a portion of the selected program. The method may further comprise the steps of receiving data indicative of the end time or length of the portion of the program and deleting at least a portion of the recorded media stream occurring between the start and end of the program portion. This can be used, for example, to remove adverts from the program.

In an embodiment, the initial timing data is provided in electronic program guide data. The second timing data may be provided relative to a program clock reference signal received by the user device.

Embodiments may include a set-top-box or other user device appropriately configured to undertake the methods outlined above. An embodiments may further provide a user device for receiving and recording media content. The user device, such as a set-top-box, may comprise one or more inputs for receiving a media content stream, initial timing data indicative of the time at which a selected program contained within the media content stream is scheduled to begin, and second updated timing data indicative of the time at which the program began. The device further comprises a memory for storing a portion of the media content stream, an output for providing media content to an output device, and a processor. The processor is arranged to control the device to receive the initial and second timing data and to store a portion of the media content stream containing the selected program on the memory, using the initial timing data to determine the recording start and finish times. The device further comprises a trim controller, which may, for example, be an independent functional unit or enacted as a program operating on the processor. The trim controller arranged to delete at least a portion of the recorded media content stream between the beginning of the recording and the beginning of the program as identified by the second timing data.

The processor may be further arranged to control the device to output a portion of the recorded media content stream in response to a user command.

In an embodiment, the media content stream is received from a broadcast system, and the apparatus further comprises an input for receiving synchronization timing data, the processor being further arranged to compare and synchronize an on-board clock signal with received synchronization timing data and wherein the second timing data is relative to the synchronization timing data.

The initial timing data may also include further data indicative of the time the selected program is scheduled to finish and the second timing data further includes data identifying the finish time of the selected program. The trim controller module may be further arranged to receive the second timing data and to delete at least a portion of the recorded media content stream between the finish time of the program as identified by the second timing data and the end of the recording.

A computer program may be provided for causing a set-top-box or other suitable user device to undertake the methods described above or below. Similarly, the user device may be configured to function in the manner described above or below by running a corresponding computer program on the processor.

Embodiments may also provide a corresponding method of broadcasting media content, comprising one or more programs, to one or more user devices for recording and subsequent viewing of the programs. The method may involve providing, to the one or more user devices, initial timing data indicative of the time at which a selected program contained within the media content stream is scheduled to begin and subsequently broadcasting a media content stream containing at least one program. The time at which the event was broadcast is then determined and second time data, identifying the start time of the program, is then issued by a method such as broadcast or other suitable methods such as upload to an internet website.

A corresponding head end apparatus for use in broadcasting media content may also be provided. The head end comprises an output for providing a media content stream containing at least one program to a transmitter for broadcast to one or more user devices and an input for receiving program scheduling information. An output is included for providing, to the one or more user devices, initial timing data indicative of the time at which a selected program contained within the media content stream is scheduled to begin based on the scheduling information and a monitoring unit is also included for determining the time at which the program was broadcast. An output for issuing second time data identifying the start time of the program is also provided, such as an output to the transmitter or an internet connection for example. A processor may be included to control the components of the head end apparatus.

A computer program may be provided for causing a head end apparatus to undertake the method described above. Similarly, the user device may be configured to function in the manner described above for broadcasting media content by running a corresponding computer program on the processor.

In an embodiment, a method of operating a user device to receive and record media content comprises: receiving, at one or more inputs, a media content stream, and initial timing data indicative of the time at which a selected program contained within the media content stream is scheduled to begin; recording a portion of the media content stream, containing the selected program, to a memory using the initial timing data to determine recording start and finish times; receiving second updated timing data indicative of the time at which the selected program began; and deleting at least a portion of the recorded media content stream between the beginning of the recording and the beginning of the program as identified by the second timing data. In an embodiment, the media content stream is received from a broadcast system and further comprising the step of receiving synchronization timing data for synchronizing the user device with the broadcast system and wherein the second timing data is relative to the synchronization timing data. In an embodiment, the method comprises receiving, in the initial timing data, further data indicative of the time the selected program is scheduled to finish and receiving, in the second timing data, updated data identifying the finish time of the selected program, and deleting at least a portion of the recorded media content stream between the finish time of the program identified by the second timing data and the end of the recording. In an embodiment, the second timing data is received via the internet or by broadcast. In an embodiment, the initial timing data is further indicative of the time at which an event related to the selected program contained within the media content stream is scheduled to occur, the event being the start time of a portion of the selected program, the method further comprising the steps of receiving data indicative of the end time or length of the portion of the program and deleting at least a portion of the recorded media stream occurring between the start and end of the program portion. In an embodiment, the program portion is an advertisement. In an embodiment, the initial timing data is provided in electronic program guide (EPG) data. In an embodiment, the second timing data is provided relative to a program clock reference (PCR) signal received by the user device.

In an embodiment, a user device to receive and record media content comprises: one or more inputs configured to receive a media content stream, initial timing data indicative of the time at which a selected program contained within the media content stream is scheduled to begin, and second updated timing data indicative of the time at which the selected program began; a memory configured to store one or more portions of the media content stream; an output configured to output media content; and one or more processing devices configured to: record a portion of the media content stream containing the selected program in the memory, using the initial timing data to determine a recording start time; and delete at least a portion of the recorded media content stream between a beginning of the recording and a beginning of the selected program as identified by the second timing data. In an embodiment, the one or more processing devices comprises a trim controller configured to delete the at least a portion of the recorded media content stream between the beginning of the recording and the beginning of the selected program as identified by the second timing data. In an embodiment, the media content stream is received from a broadcast system, the one or more inputs are configured to receive synchronization timing data, the one or more processing devices are configured to compare and synchronize a clock signal with received synchronization timing data and the second timing data is relative to the synchronization timing data. In an embodiment, the initial timing data includes data indicative of a time the selected program is scheduled to finish, the second timing data includes data identifying a finish time of the selected program, and the one or more processing devices are configured to receive the second timing data and to delete at least a portion of the recorded media content stream between the finish time of the program as identified by the second timing data and the end of the recording. In an embodiment, the initial timing data is further indicative of the time at which an event related to the selected program contained within the media content stream is scheduled to occur, the event being the start time of a portion of the selected program, the user device is configured to receive data indicative of the end time or length of the portion of the program, and the one or more processing devices are configured to delete at least a portion of the recorded media stream occurring between the start and end of the program portion.

In an embodiment, a set-top-box comprises: a receiver configured to receive media content streams, initial timing data indicative of the time at which selected programs contained within the media content streams are scheduled to begin, and updated timing data indicative of the time at which selected programs began; a memory configured to store portions of media content streams; an output controller configured to output media content; and one or more processing devices configured to: determine a recording start time associated with a selected program based on initial timing data associated with the selected program; initiate recording in the memory of a portion of a media content stream containing the selected program based on the determined recording start time; and delete at least a portion of the recorded portion of the media content stream between a beginning of the recording and a beginning of the selected program as identified by updated timing data associated with the selected program. In an embodiment, the initial timing data associated with the selected program includes data indicative of a time the selected program is scheduled to finish, the updated timing data associated with the selected program includes data identifying a finish time of the selected program, and the one or more processing devices are configured to delete at least a portion of the recorded media content stream between the finish time of the selected program as identified by the updated timing data and an end of the recording. In an embodiment, the initial timing data associated with the selected program is indicative of a time at which an event related to the selected program contained within the media content stream is scheduled to occur, the event being a start time of a portion of the selected program, the receiver is configured to receive data indicative of an end time or length of the portion of the selected program, and the one or more processing devices are configured to delete at least a portion of the recorded media stream occurring between the start and end of the program portion.

In an embodiment, a non-transitory computer-readable medium's contents configure a media processing system to perform a method, the method comprising: recording a portion of a media content stream containing a selected program to a memory based on received initial timing data associated with the selected program; and deleting at least a portion of the recorded media content stream between a beginning of the recording and a beginning of the selected program as identified by received updated timing data associated with the selected program. In an embodiment, the method comprises deleting at least a portion of the recorded media content stream between an end of the recording and an end of the selected program as identified by received updated timing data associated with the selected program.

In an embodiment, a method of broadcasting media content comprises: providing, to one or more user devices, initial timing data indicative of a time at which a selected program contained within a media content stream is scheduled to begin; broadcasting the media content stream containing the selected program to the one or more user devices; determining a time at which the selected program was broadcast; and issuing second timing data identifying a start time of the selected program.

In an embodiment, a head end apparatus comprises: an input configured to receive program scheduling information associated with programs in media content streams; a monitoring unit configured to determine times at which programs are broadcast; and one or more outputs configured to: provide a media content stream containing at least one program to broadcast to one or more user devices; provide initial timing data indicative of a time at which a selected program contained within the media content stream is scheduled to begin based on the scheduling information; and provide second time data identifying a start time of the selected program based on a time determined by the monitoring unit.

In an embodiment, a head end apparatus comprises: an input configured to receive program scheduling information associated with programs in media content streams; and one or more processing devices configured to: provide a media content stream containing at least one program to broadcast to one or more user devices; provide initial timing data indicative of a time at which a selected program contained within the media content stream is scheduled to begin based on the scheduling information; determine a time at which the selected program was broadcast; and provide second time data identifying a start time of the selected program based on the determined time.

BRIEF DESCRIPTION OF THE DRAWINGS

Example embodiments will now be described with reference to the accompanying figures in which.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations, such as, for example, processors, computer-readable media, etc., are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" "according to an embodiment" or "in an embodiment" and similar phrases in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
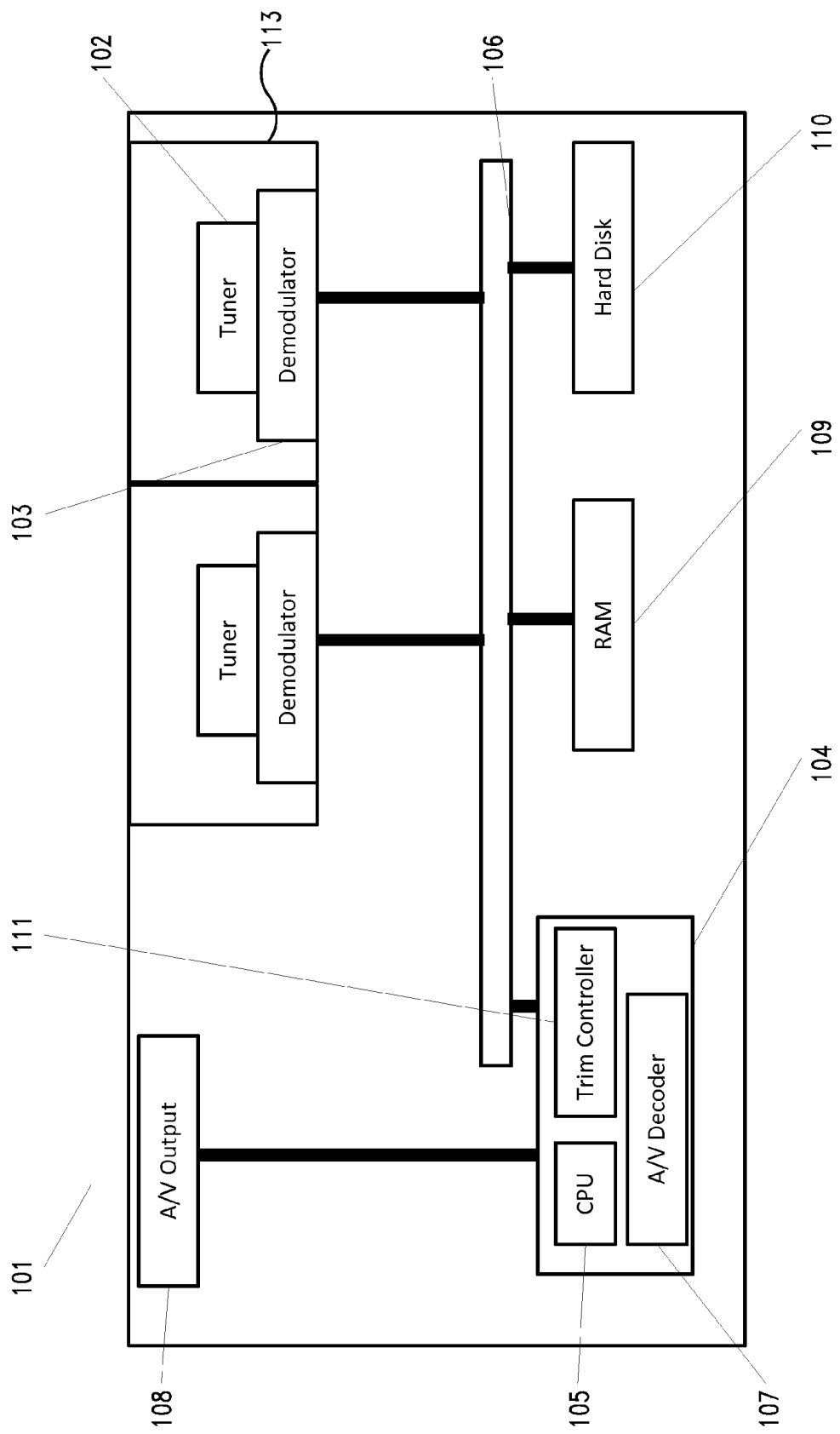
FIG. 1: shows a diagram of a STB according to an embodiment.

A first example embodiment may be implemented with a set-top-box (STB) of the sort shown in FIG. 1. The STB 101 comprises a receiver 113 for receiving broadcast signals including encoded media content, such as video and audio content. The media content is provided to a processor for decoding and outputting the content. In the example of FIG.

1, a tuner 102 is included that tunes to and amplifies a particular broadcast frequency. A demodulator 103 converts the modulated broadcast signal from the tuner into a digital signal that may be processed by the processor 104. A digital arrangement could equally be used for receiving, demodulating and decoding digital broadcasts such as Digital Video Broadcasting (DVB) compliant broadcasts. The STB may be equipped to receive and process multiple broadcasts, for example by having tuner/demodulator packages that can each display/record a television channel simultaneously with the other package. Alternatively, the STB may rely on the tuner/demodulator in an attached device such as a television.

The tuner/demodulator is connected to a processor chip 104, comprising a CPU 105, by a bus 106. The main processor 104 of the STB runs the set-top-box software and controls and coordinates the other set-top-box components. The AV decoder 107 is responsible for decoding the audio and video data and may be provided on the same physical chip as the CPU. The AV decoder receives and decodes the encoded digital signal provided by the demodulator. The decoded audio/video signals are provided to the AV output, or AV control, 108, which provides an audio and video signal that can be connected to an output device or display device such as a television. The RAM 109 can be used by both the processor and the decoders. A memory, in the form of a hard disk 110 is provided for storing recorded content for presentation at a later time, although other types of memory, such as flash memory, etc., may be used. The hard disk can also be used to store metadata, or a flash memory could alternatively, or in addition, be provided for this purpose.

A media content signal, such as a television broadcast signal is received via the STB tuner and demodulator from a broadcaster. The signal may be broadcast over the air waves, satellite, internet, cable or any other suitable method. Typical encoding formats for broadcast data include the MPEG standards such as MPEG-2 and MPEG-4. The demodulated digital broadcast signal is then sent to two places. Firstly, as is known for STBs, the signal is sent to a decoder 107 to be converted into an appropriate signal to be provided to an output device for display or presentation to the user. Typically, this involves converting a digitally encoded broadcast signal into an analogue signal and providing this to a display device, such as a television screen, via an NV output module 108, although the STB could output the encoded content directly, as MPEG-2 for example, or additionally, or instead, could include converting to a different digital format using a digital reformat module for reformatting the decoded audio/video for output as, for example, DVI, HDMI and/or SPDIF, via digital outputs. Secondly, the broadcast signal may also be sent to the memory 110 for storage and later viewing, at the request of the user, or under the control of the main processor 104. As shown in FIG. 1, multiple tuners/demodulators may be provided such that one program or channel can be viewed while another is recorded.

An STB with DVR functionality may receive electronic program guide (EPG) data or other scheduling information, typically in the form of metadata provided within the broadcast stream. Standards for delivery of scheduling information to television-based EPGs vary from application to application, and by country. Older television EPGs rely on analogue technology, such as the vertical blanking interval of analogue television video signals. Options include sending the EPG data within an MPEG transport stream, or alongside it in a special data stream. Some standards for terrestrial digital TV, for example, use tables sent in Program and System Information Protocol (PSIP) data. However it is sent, the EPG data contains information such as program start times and titles along with additional program descriptive metadata.

The EPG function allows the user to access scheduling information via a menu and allows the option to record a particular program or series of programs, for example, when the user selects a program to be recorded the STB determines when to start and finish recording based on the EPG or scheduling information that has been provided in advance. Often the EPG scheduling data will only be accurate to within a few minutes. This is because a program schedule will often run early or late due to, for example, overrunning of live broadcasts or other last minute changes to the schedule. If the DVR were to commence or cease recording at the exact time indicated by the EPG data then the start or end of a program may be lost. Therefore, the recording system may be programmed to introduce a predetermined excess recording time ahead of and/or behind a program such that the DVR begins recording early and/or finishes late. Optionally, the user may be able to select the predetermined time periods ahead of and following the program of interest.

Although scheduling information does not allow accurate prediction of start and end times of programs, once a program has been broadcast, or has begun being broadcast, this information becomes known to the broadcasting entity. The broadcast head end can record the actual time at which the program broadcast began, along with the finish time. Alternatively, the finish time can be extrapolated by adding the length of the program to the start time, since the program length is also reliably known to the broadcaster/head end.

In addition, control data, which may include PCR (Program Clock Reference) data, enable data, and start up values, may be extracted from the bit stream and used to control the demultiplexing of the interleaved compression layers, and in doing so defines the functions necessary for combining the compressed data streams.

Timing data is commonly provided from the broadcaster/head end to each STB. The timing data may be in the form of the above mentioned program-clock reference data (PCR), which can be extracted from the program transport stream by a suitable decoder. The PCR timing data syncs the STB clock with the broadcaster/transmitter clock and is used to ensure media content, such as a television program, is played back on a user device in a predetermined manner, such as at a predetermined frame rate with audio and video components synchronized. The PCR data provides the STB with accurate timing information but does not indicate when a particular program starts ahead of the event.

An example of the timing data received by the STB will be described in relation to the MPEG-2 standard, although it will be appreciated that other broadcast encoding standards and other forms of timing information may be used. According to the MPEG-2 standard, the data of compressed audio and video is inserted into program elementary stream (PES) packets. PES packet data, and additional data, relating to one or more programs may be combined into a transport stream. The transport stream is formed into packets of fixed length, each including a header of four bytes and a data payload of 184 bytes. A packet identification code, or PID, is provided to identify the contents of the associated packet. In addition, PES packets may also contain PCR values, presentation time stamps (PTS) and decoding time stamps (DTS). The PTS indicates the time at which a video picture or audio frame should be output relative to the head end clock and enables the synchronization of video and audio of media content. The DTS indicates the time when a video picture should be decoded relative to the encoder clock. In MPEG-2 systems the digital video source is clocked at 27 MHz, and so the STB decoder generates a matching 27 MHz clock so that the encoder and decoder clocks are synchronized. To achieve synchronization, the encoder sends the PCR to the decoder. The decoder receives the packet and compares the timing value with the STB onboard clock value. The program clock reference may be transmitted in a data field in the PID for the particular program. As an example, the PCR may be a 42 bit field having a 33 bit value in units of 90 kHz, and 9 bits in units of 27 MHz. The first 42 bits of the first PCR are used to initialize a STB clock counter, and subsequent PCR values are compared to the STB clock for smaller adjustments.

Once a program has been broadcast, or has begun broadcasting, the timing information is known since the broadcaster can identify when the program commenced, with reference to the PCR, and will usually know its duration accurately. This can then be communicated to an STB by issuing timestamp data indicative of when the program began and, optionally, finished. The STB receives the timestamp data, which is given in relation to the PCR data. This timing information identifies a particular program and the start time, and optionally the end time, in relation to the accurate timing information provided by the broadcaster.

The timestamp information is stored on a memory, which may be local to, or internal to, the STB, and is associated with the recording data of the relevant program. The PCR data for a given recorded program may also be stored as it is received.

When the user decides to view a stored program this is typically done by selecting a particular file that references the desired program using an interface. Rather than play the entire data file, which will include additional recorded material at the beginning as described above, the processor of the STB performs a check of the accurate timestamp information received from the broadcaster/head end. The system will then commence the playing of the file from the location identified by the timestamp, rather than the beginning of the file. This prevents the user having to navigate through unwanted content, which would hinder the viewing experience. Such an approach could also, or instead, be applied to advertisements contained within the program itself. The broadcaster or other entity can provide timestamp data referencing the start and end of the adverts, either relative to the program start time or as an absolute value for example. The STB could then stop playing at the indicated start of the adverts, and commence at the indicated end time, allowing adverts or other unwanted content to be skipped.

The accurate timing information may be provided in broadcast metadata that references a program according to EPG data. Alternatively, the timing information may reference simply a channel number and the clock time at which the program in question actually started. The STB uses this information to determine when a particular recorded program should be started. The metadata containing the accurate program start time may be broadcast at any time after it becomes known. Typically this will be after the broadcasting of the relevant program has begun, and may be included as part of the transmission of the program in question. Alternatively, the timing information may be broadcast on an out of band, or dedicated, data channel or any other type of separate data channel, or via an internet connection to the STB.

As well as, or instead of, commencing playback of a recorded program from a particular time point identified by referencing the separately provided timing data provided by the broadcaster the STB DVR may trim or cut the recordings to save recording space. The main processor may include a trim controller functional unit 111, which may be implemented as software executing on the CPU or other component of the main processor.

The trim function operates by accessing a database or look-up table, stored on a memory such as hard disk 110, containing the received accurate timing information for the selected program. The received timing information, including the program start timestamp, indicates accurately when the program commenced relative to the head end clock, which is synchronized with the STB clock. The processor then controls the memory to delete at least a portion of any additional material recorded before the program commenced. In addition, the processor may control the hard drive to delete any recorded material captured after the end of the program.

The manner in which the program data prior to the beginning, and after the end, of a program are removed can be achieved in different ways. One manner is to copy the media content data file and when doing so alter the file to remove the data relating to the undesired content. However, deletion of the required portions can be achieved without requiring the file to be copied by using a technique known as hole punching.

STBs can be programmed with the ability to "punch a hole" in a file. A portion of the file is marked as being unwanted and the associated storage released for reuse. In particular, a file storage system may rely on a number of data blocks each corresponding to a specific number of bytes of physical space on the memory. Hole punching allows certain blocks to be identified in an appropriate list as being free to store data. One example of a use for this system is for time shifted viewing of "live" television, in which an STB continually records a particular channel and the user can pause, or rewind, a live broadcast. Because storage space is finite, the STB will be arranged to only record a fixed period, such as a one hour period. One option to do this would be to use a fixed size file as a circular buffer; once the one hour period is full, the buffer can begin recording at the start address or start block of the buffer file. However, using the hole punching technique, a hole is "punched" at the beginning of the file, causing the start address or block of the buffered content to move forward as the older content in the buffer is discarded. The file pointer referencing the start of the file is adjusted to reference the new start address.

Embodiments may use hole punching to trim a stored media content file. For example, a recorded television program may sequentially occupy blocks 10 to 70 of a memory system (it should be noted that the block numbers are purely for illustrative purposes and not representative of actual file size). However, the timing data indicates that the program data actually only occupies blocks 20 to 60. The trim function therefore operates to hole punch blocks 10 to 19 and 61 to 70, meaning that these blocks are marked as being free for subsequent storage, or are listed in a table showing blocks that may be written to. The start address of the program data has changed and the start address pointer is updated accordingly.

Large media files may be stored in fragmented sections in multiple memory locations. Pointers for the file will point to the memory location or locations in which the file segments are stored. The address information may be stored in a linked list or a block table. The pointer address information is updated such that the program data is correctly referenced when the recorded content is trimmed. However, if only the start and end of the content is being trimmed then only the pointer referencing these positions may need to be altered/updated.

It is also possible, in some embodiments, to utilize the hole punching technique to remove unwanted content between the beginning and end of a program. For example, the recorded program may contain adverts that the user does not want to see, and that occupy unnecessary space on the memory. The broadcaster or other entity may provide accurate timing information indicative of the location of the adverts within the program. As with the start and finish times the broadcaster may issue accurate timestamp data identifying the start and end times of the advert or adverts for example. These times may be determined by the broadcaster or transmission system, or they may be known relative to the actual start time of the program. These portions may then be hole punched as described above. Referring back to the example above, received timestamp information may indicate that adverts occur during blocks 40 to 45. Therefore, the trim function identifies these blocks, based on timestamp data referencing the adverts as unwanted content, and hole punches the identified blocks as described above. Such an arrangement may require additional pointers to be created, or existing pointers to be modified, since it would create a gap in the program data file, or lead to a fragmented file, with blocks 20 to 39 and 46 to 60 having a portion of free memory space between them. Therefore, the trim function may introduce additional pointers to reference the end of one portion and the start of the next portion such that the data can be read as a single file by the system. This may be used in isolation to remove content from the middle of a program, without requiring the removal of content from the start or end of the file.

Figure 2:
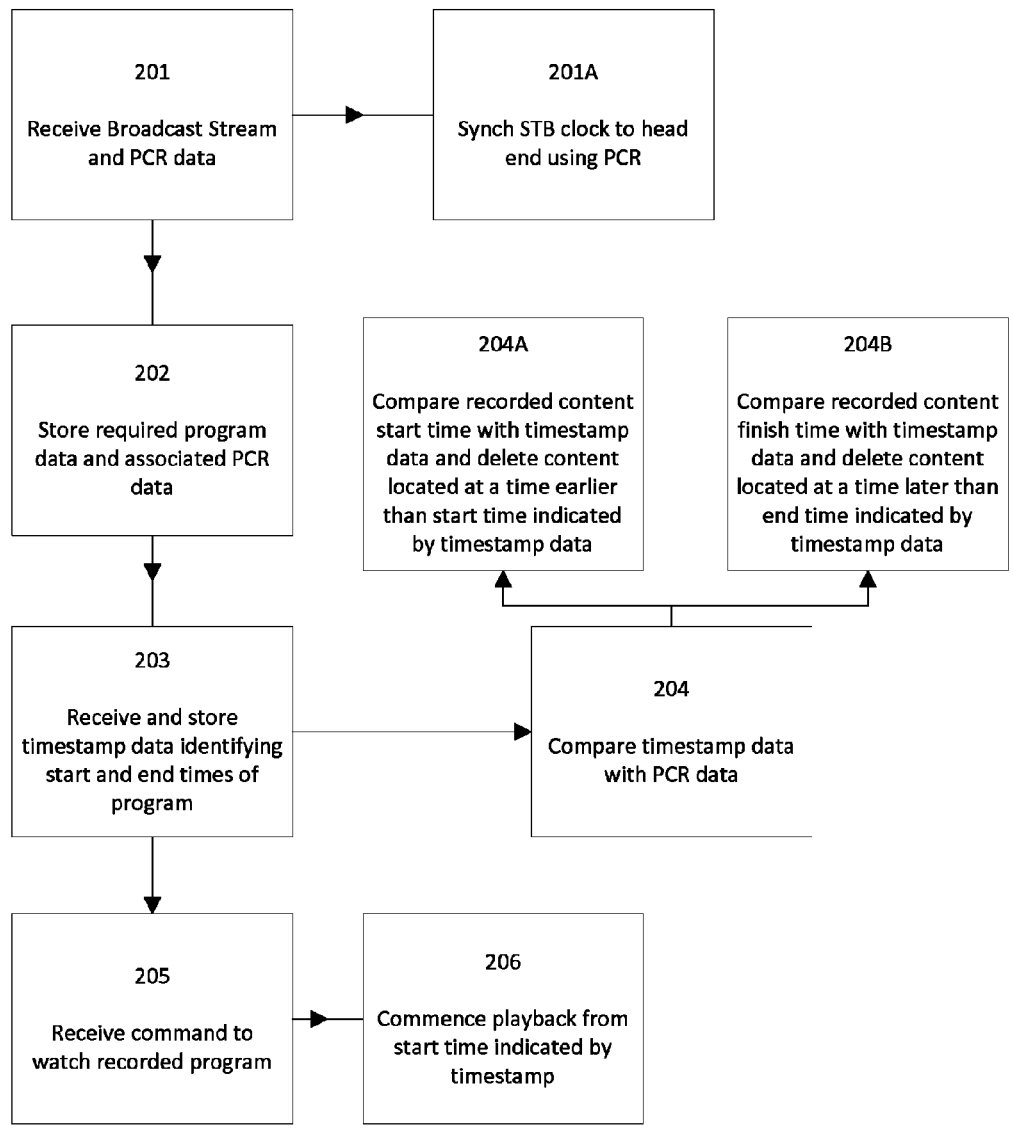
FIG. 2: shows the steps involved in a method according to an embodiment.

FIG. 2 sets out the steps involved at the STB, for receipt of a single program or portion of media content, in a method according to at least some embodiments. At step 201 the STB receives, from a broadcaster, the program stream containing a program that the user has indicated they would like to record, or that the STB has selected to record based on its programming. At step 201A, which may occur continuously or repeatedly, the STB synchs the onboard clock to the head-end clock using the received PCR signal. The STB uses the PVR function to store the program content at step 202, optionally along with the PCR data used to synchronise the STB with the broadcaster. After storing, during the process of recording, or at any other time, the broadcaster issues accurate timestamp data indicative of the timing of one or more events occurring during the program such as the start and end times of the program, as determined by the broadcaster or transmission system at step 203. This timestamp data indicates times relative to the received synch data, such as the PCR data. Should the user then wish to watch the recorded program, they can send an instruction to the STB, received at step 205, which in response compares the timestamp data from the head-end against the recorded PCR data associated with the recorded program and commences playback of the content from the start time indicated by the timestamp data at step 206. In addition to, or instead of, commencing playback at the timestamp location, the STB at steps 204, 204A and 204B compares the received timestamp data with the stored PCR data related to the recorded program and removes/deletes recorded content prior to the timestamp indicated start time and, optionally, after the timestamp indicated finish time.

Figure 3A:
FIG. 3A: shows a diagram indicating timings in relation to a broadcast program.

FIG. 3A shows an example of the timings involved in relation to a recorded program. The EPG data received by the STB indicates that the program in question begins at time EPG0 and ends at time EPG1. The user wants to record this and has activated, or selected the option in the STB set-up to prerecord and post record by a predetermined amount U0 and U1 respectively. The STB therefore starts recording at time EPG0−U0, shown as time R0 in FIG. 3. Similarly, the STB stops recording at time R1 which corresponds to a time of EPG1+U1. In fact, the program was actually transmitted, and began, at time PA0, as indicated by the transmission provided by the broadcaster. The STB therefore trims or removes the recorded data between times R0 and PA0 and optionally also between PA1 and R1.

Figure 3B:
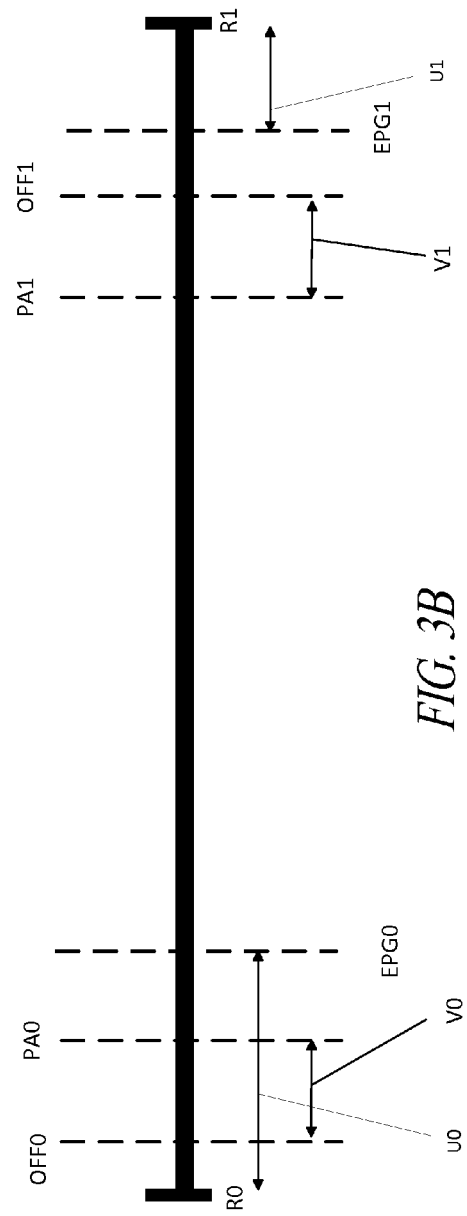
FIG. 3B: shows a further diagram indicating timings in relation to a broadcast program.

The broadcaster may not wish to remove all the additional material at the start and end of the program. The broadcast may, for example, include advertisements before and after the program that the broadcaster may wish the user to see. Therefore, the timestamp data that is provided to the user may be offset by a predetermined amount, relative to the true start time of the program content, such that playback begins early and/or continues past the end of the program content. FIG. 3B illustrates how the offset may be applied, using the same labeling as FIG. 3A for common elements. As before, the EPG data indicates that the program started at time EPG0, but the subsequent timestamp data from the broadcaster/head end indicates that the program actually started at time PA0. Based on the EPG data, recording begins at time R0, which is a predetermined period U0 ahead of time EPG0. When the user views the program, or when the recording is trimmed, rather than starting playback from, or trimming to, the actual start time PA0, it is done to an offset value OFF0, which is offset from time PA0 by a predetermined amount such as from 1 to 3 minutes. Likewise, at the end of the program, rather than trimming or deleting content from the end of the recording to time PA1, a smaller amount is deleted to OFF1, which is offset from time PA1 by a predetermined amount, again such as 1 to 3 minutes.

Embodiments have been described in relation to STBs for receiving and descrambling broadcast video and accompanying audio data, particularly over the air or via satellite. The term "set-top-box" may be applied to any device for performing the function of receiving, decoding and outputting media content. This could include televisions with inbuilt set-top-boxes, appropriately programmed and connected computers and so forth. It will be appreciated that the disclosure may equally be applied to any device for recording, or storing, and outputting media content. This would include televisions with inbuilt set-top-boxes, computers connected to the internet or other network, mobile phones or similar mobile devices able to output media content, PDAs and so forth. The disclosure could also be applied to audio only devices such as radios, including digital radios.

Whilst embodiments have been described in which the DVR functionality is combined with the STB to form a single device, it would also be possible to use a separate STB receiver/decoder in conjunction with a stand-alone DVR. The DVR would receive the relevant signals and timing data from the STB.

Embodiments have been described in the context of receiving audio, or audio and video, by broadcast. The term "broadcasting" should also be taken to encapsulate delivery of data by any form such as over the air, via the Internet, cable or satellite or any other type of transmission.

Embodiments have been described above along with a number of optional features. Further alternative embodiments that fall within the scope of the present disclosure are described below, which may also incorporate any of the features described above.

Embodiments could provide a method of operating a user device for receiving and recording media content. The method comprises receiving, at one or more inputs, a media content stream, and initial timing data, such as EPG data for example, indicative of the time at which an event related to a selected program, such as the start time of the program, occurs, the program being contained within the media content stream. At least a portion of the media content stream containing the selected program is recorded to a memory using the initial timing data to determine the recording start and finish time. Second updated timing data, indicative of the time at which the event occurred, is also received. A portion of the recorded media content stream is then output, the output portion being determined relative to the second timing data. The second timing data may be made more accurate than the first or initial timing data, and therefore recorded content that does not contain the desired program may not be output.

The second timing data may be received before or after the content is broadcast. In an embodiment, it is received afterwards, and is determined based on the broadcast time of the content. The second timing data may be received via the internet or by broadcast for example.

In an embodiment, outputting a portion of the recorded media content stream includes outputting the recorded media content stream from a time subsequent to the start of the recording, the time being determined relative to the second timing data. This allows the viewer to avoid watching excess material recorded at the start, before the program had actually begun.

In an embodiment, the media content stream is received from a broadcast system and the method further includes the step of receiving synchronization timing data for synchronizing the user device with the broadcast system and the second timing data is provided relative to the synchronization timing data. The synchronization timing data may be PCR data.

Embodiments may rely on receiving accurate timestamps after the broadcast of a program, for example on an out of band channel or internet connection, to a user recording device. The recording device may then automatically remove, or trim, any excess program data from the start and/or the end of the recordings.

In an embodiment, the method also includes the step of deleting at least a portion of the recorded media content stream based on the second timing data, thus saving on finite memory space. In an embodiment, the portion of deleted content is located between the beginning of the recording of the portion of the media content stream and the program start time as identified by the second timing data. The output of the content may begin immediately after the deleted portion. This removes unwanted content from the start of the program and allows the viewer to begin watching their content faster.

The method may also include the step of receiving, in the initial timing data, further data indicative of the time the selected program is scheduled to finish and also receiving, in the second timing data, updated, or more accurate, data identifying the finish time of the selected program. At least a portion of the recorded media content stream between the finish time of the program identified by the second timing data and the end of the recording is then deleted. This enables space to be saved by removing unwanted content from the end of the recording.

In an embodiment, deletion of content from the recorded media stream is achieved by identifying the portion to be deleted as being available memory space. For example, the "hole punching" method of deletion and file management can be used, whereby memory blocks containing unwanted media content are identified in an appropriate list as being free to store data.

In an embodiment, the initial timing data is provided in electronic program guide data. The second timing data may be provided relative to a program clock reference signal received by the user device.

In some embodiments of a method the event may be the start time of a portion of the selected program. The method may further comprise the steps of receiving data indicative of the end time or length of the portion of the program and outputting a portion of the recorded media stream occurring before the portion and after the portion. This can be used to avoid watching undesired material, including advertisements for example, such that the portions of the program before and after the undesired content are output. The methods described for removing or deleting content can also be used in conjunction with this feature.

Embodiments may include a set-top-box or other user device appropriately configured to undertake the methods outlined above. For example, embodiments may further provide a user device for receiving and recording media content. The user device, such as a set-top-box, may comprise one or more inputs for receiving a media content stream containing a selected program, initial timing data indicative of the time at which an event related to the selected program is scheduled to occur, and second updated timing data indicative of the time at which the event occurred. The device further comprises a memory for storing a portion of the media content stream, an output for providing media content to an output device and a processor. The processor is arranged to control the device to receive the initial and second timing data and to store a portion of the media content stream containing the selected program on the memory, using the initial timing data to determine the recording start and finish times. The processor is further arranged to control the device to receive a command to output the selected program and, in response, to output a portion of the recorded media content stream relative to the second timing data.

The event may be the start time of the selected program, and the processor may be further arranged to output the media content stream portion from a time subsequent to the start of the recording, this time being determined relative to the start time indicated by the second timing data.

In an embodiment, the media content stream is received from a broadcast system, and the apparatus further comprises an input for receiving synchronization timing data, the processor being further arranged to compare and synchronize an on-board clock signal with received synchronization timing data and wherein the second timing data is relative to the synchronization timing data.

A trim controller module may also be provided, the trim controller module being arranged to receive the second timing data and to delete at least a portion of the recorded media content stream based on the second timing data. In an embodiment, the trim controller module is arranged to receive the second timing data and to delete at least a portion of the recorded media content stream between the beginning of the recording of the portion of the media content stream and the program start time as identified by the second timing data.

The initial timing data may also include further data indicative of the time the selected program is scheduled to finish and the second timing data further includes data identifying the finish time of the selected program. The device may further comprise an additional trim controller module arranged to receive the second timing data and to delete at least a portion of the recorded media content stream between the finish time of the program as identified by the second timing data and the end of the recording. Of course, the same trim module as used to trim the beginning of recordings may also be used for this purpose.

A computer program may be provided for causing a set-top-box or other suitable user device to undertake the methods described above or below. Similarly, the user device may be configured to function in the manner described above or below by running a corresponding computer program on the processor.

Embodiments may also provide a corresponding method of broadcasting media content, comprising one or more programs, to one or more user devices for recording and subsequent viewing of the programs. The method may involve providing, to the one or more user devices, initial timing data indicative of the time at which an event related to a selected program contained within the media content stream occurs and subsequently broadcasting a media content stream containing at least one program. The time at which the event was broadcast is then determined and second time data, identifying the time of the event, is then issued by a method such as broadcast or other suitable methods such as upload to an internet website.

A corresponding head end apparatus for use in broadcasting media content may also be provided. The head end comprises an output for providing a media content stream containing at least one program to a transmitter for broadcast to one or more user devices and an input for receiving program event scheduling information. An output is included for providing, to the one or more user devices, initial timing data indicative of the time at which an event related to a selected program contained within the media content stream occurs based on the scheduling information and a monitoring unit for determining the time at which the event was broadcast. A further output is provided for issuing second time data identifying the time of the event.

In an embodiment, the event is the start time of the program, the first timing data being based on the scheduled start time and the second timing data identifies the time at which the program started based on the determination of the time at which the program start was broadcast, as determined by the monitoring unit.

Some embodiments may take the form of computer program products. For example, according to one embodiment there is provided a computer readable medium comprising a computer program adapted to perform one or more of the methods described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the systems and/or modules may be implemented or provided in other manners, such as at least partially in firmware and/or hardware, including, but not limited to, one or more application-specific integrated circuits (ASICs), discrete circuitry, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology. In some embodiments, some of the modules or controllers separately described herein may be combined, split into further modules and/or split and recombined in various manners.

The systems, modules and data structures may also be transmitted as generated data signals (e.g., as part of a carrier wave) on a variety of computer-readable transmission mediums, including wireless-based and wired/cable-based mediums.

The various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operating a set top box to receive and record media content, the method comprising:
receiving at the set top box from a media content source, initial timing data indicative of a scheduled start time and a scheduled end time of a selected program, the selected program contained within a media content stream, the initial timing data formed as metadata from the media content source;
after receiving the initial timing data, receiving, at one or more inputs, the media content stream;
recording the selected program of the media content stream to a memory using the initial timing data to determine a recording start time and a recording finish time;
after recording at least some of the selected program of the media content stream, receiving from an Internet source different from the media content source, second updated timing data indicative of an updated start time of the selected program and indicative of at least one of an updated end time of the selected program and a duration of the selected program;
deleting at least a first portion of the recorded media content stream between a beginning of the recording and a beginning of the program identified by the second timing data; and
deleting at least a second portion of the recorded media content stream between an end of the program calculated from the second timing data and an end of the recording.

2. The method according to claim 1 wherein the media content stream is received from a broadcast system and further comprising the step of receiving synchronization timing data for synchronizing the user device with the broadcast system and wherein the second timing data is relative to the synchronization timing data.

3. The method according to claim 1 wherein the second timing data is received via the internet or by broadcast.

4. The method according to claim 1 wherein the initial timing data is further indicative of the time at which an event related to the selected program contained within the media content stream is scheduled to occur, the event being the start time of a portion of the selected program, the method further comprising the steps of receiving data indicative of the end time or length of the portion of the program and deleting at least a portion of the recorded media stream occurring between the start and end of the program portion.

5. The method according to claim 4 wherein the program portion is an advertisement.

6. The method according to claim 1 wherein the initial timing data is provided in electronic program guide (EPG) data.

7. The method of claim 1 wherein the second timing data is provided relative to a program clock reference (PCR) signal received by the user device.

8. A set top box to receive and record media content, comprising:
one or more inputs configured to receive a) a media content stream, b) initial timing data indicative of the time at which a selected program contained within the media content stream is scheduled to begin and scheduled to end, and c) second updated timing data indicative of the time at which the selected program began, wherein the one or more inputs is configured to receive the initial timing data as metadata from a media content source prior to receiving the selected program contained within media content stream, and wherein the one or more inputs is configured to receive the updated timing data from an Internet source different from the media content source;

a memory configured to store the selected program of the media content stream;

an output configured to output media content; and one or more processing devices configured to:
record the selected program of the media content stream in the memory using the initial timing data to determine a recording start time; and
delete at least a portion of the recorded media content stream between a beginning of the recording and a beginning of the selected program as calculated from the second timing data and the initial timing data.

9. The user device of claim 8 wherein the one or more processing devices comprises a trim controller configured to delete the at least a portion of the recorded media content stream between the beginning of the recording and the beginning of the selected program as identified by the second timing data.

10. The user device according to claim 8 wherein the media content stream is received from a broadcast system, the one or more inputs are configured to receive synchronization timing data, the one or more processing devices are configured to compare and synchronize a clock signal with received synchronization timing data and the second timing data is relative to the synchronization timing data.

11. The user device according to claim 8 wherein the initial timing data includes data indicative of a time the selected program is scheduled to finish, the second timing data includes data identifying a finish time of the selected program, and the one or more processing devices are configured to receive the second timing data and to delete at least a portion of the recorded media content stream between the finish time of the program as identified by the second timing data and the end of the recording.

12. The user device according to claim 8 wherein the initial timing data is further indicative of the time at which an event related to the selected program contained within the media content stream is scheduled to occur, the event being the start time of a portion of the selected program, the user device is configured to receive data indicative of the end time or length of the portion of the program, and the one or more processing devices are configured to delete at least a portion of the recorded media stream occurring between the start and end of the program portion.

13. The set-top-box of claim 8, comprising:
a trim controller configured to delete at least a second portion of the media content stream between an end of the recording and an actual end of the selected program as calculated from the updated timing data associated with the selected program.

14. The set-top-box of claim 8 wherein the deleted portion of the recorded media content stream is deleted using a hole-punching technique.

15. The set-top-box of claim 8 wherein the deleted portion of the recorded media content stream is deleted using by updating at least one pointer.

16. A non-transitory computer-readable medium whose contents configure a media processing system to perform a method, the method comprising:

recording a selected program of a media content stream to a memory based on received initial timing data associated with the selected program; and deleting at least a portion of the recorded selected program of the media content stream between a beginning of the recording and an actual beginning of the selected program, the actual beginning of the selected program identified by received updated timing data associated with the selected program, wherein the initial timing data is received from an external electronic program guide source, and wherein the updated timing data is received from a same source that provides the media content stream, wherein the source that provides the media content stream is different from the external electronic program guide source, and wherein at least one advertisement remains stored in the memory before the actual beginning of the selected program.

17. The non-transitory computer-readable medium of claim 16 wherein the method comprises deleting at least a portion of the recorded media content stream between an end of the recording and an end of the selected program as identified by received updated timing data associated with the selected program.

18. A method of broadcasting media content, comprising:
providing, from an Internet source to one or more user devices, initial timing data indicative of a time at which a selected program contained within a media content stream is scheduled to begin;
broadcasting, from a transmission source different from the Internet source, the media content stream containing the selected program to the one or more user devices;
issuing, from the transmission source, second timing data identifying an actual start time of the selected program; and
identifying at least one advertisement in the media content stream that is not to be deleted, the at least one advertisement located between the initial timing data and the actual start time of the selected program.

19. A head end apparatus, comprising:
an input configured to receive program scheduling information associated with programs in media content streams; and
one or more processing devices configured to:
derive initial timing data indicative of a time at which a selected program contained within a media content stream is scheduled to begin, the initial timing data based on the scheduling information received from an electronic program guide source;
control a first output component that provides the initial timing data broadcast to one or more user devices via the Internet;
control a media content delivery output that provides the media content stream containing the selected program broadcast to the one or more user devices via a transmission source different from the Internet;
control a monitoring unit that determines a time at which the selected program was broadcast;
derive second time data identifying an actual start time of the selected program, the second time data based on the determined time at which the selected program was broadcast, wherein the actual start time is offset by a predetermined amount to include at least one advertisement between the time at which the selected program contained within the media content stream is scheduled to begin and the actual start time of the selected program; and control the media content delivery output that provides the second time data broadcast to one or more user devices.

* * * * *